us009488056B2

United States Patent
Nagle et al.

(10) Patent No.: US 9,488,056 B2
(45) Date of Patent: Nov. 8, 2016

(54) PROPELLER BLADE WITH MODIFIED SPAR LAYUP

(71) Applicants: HAMILTON SUNDSTRAND CORPORATION, Windsor Locks, CT (US); RATIER-FIGEAC SAS, Figeac (FR)

(72) Inventors: David P. Nagle, Westfield, MA (US); Patrice Brion, Lunan (FR); Ludovic Prunet, Themines (FR)

(73) Assignees: RATIER-FIGEAC SAS, Figeac (FR); HAMILTON SUNDSTRAND CORPORATION, Windsor Locks, CT (US)

( * ) Notice: Subject to any disclaimer, the term of this patent is extended or adjusted under 35 U.S.C. 154(b) by 738 days.

(21) Appl. No.: 13/873,705

(22) Filed: Apr. 30, 2013

(65) Prior Publication Data

US 2013/0287584 A1    Oct. 31, 2013

(30) Foreign Application Priority Data

Apr. 30, 2012   (EP) .................................... 12305486

(51) Int. Cl.
  *F01D 5/14*     (2006.01)
  *B64C 11/26*    (2006.01)
(52) U.S. Cl.
  CPC ............... *F01D 5/147* (2013.01); *B64C 11/26* (2013.01); *Y10T 29/49332* (2015.01)
(58) Field of Classification Search
  CPC .. F01D 5/147; B64C 11/26; Y10T 29/49337

USPC ......................................................... 416/226
See application file for complete search history.

(56) References Cited

U.S. PATENT DOCUMENTS

| | | | |
|---|---|---|---|
| 3,782,856 A | 1/1974 | Salkind et al. | |
| 4,810,167 A | 3/1989 | Spoltman et al. | |
| 5,127,802 A | 7/1992 | Carlson et al. | |
| 5,222,297 A | 6/1993 | Graff et al. | |
| 5,269,658 A * | 12/1993 | Carlson ................ | B64C 11/26 29/889.71 |
| 5,939,007 A | 8/1999 | Iszczyszyn et al. | |

FOREIGN PATENT DOCUMENTS

EP        0256916 A1    2/1988

OTHER PUBLICATIONS

European Search Report, EP12305486.8,, Oct. 15, 2012, 8 pages.

* cited by examiner

*Primary Examiner* — Craig Kim
*Assistant Examiner* — Brian O Peters
(74) *Attorney, Agent, or Firm* — Cantor Colburn LLP

(57) ABSTRACT

According to one embodiment, a propeller blade includes a foam core and a structural layer formed of multiple layers that surrounds at least a portion of the foam core. The structural layer includes a mid-thickness location defined between the foam core and an outer edge of the structural layer and the multiple layers include at least one unidirectional layer and at least one biased layer disposed asymmetrically about the mid-thickness location.

12 Claims, 4 Drawing Sheets

US 9,488,056 B2

PROPELLER BLADE WITH MODIFIED SPAR LAYUP

CROSS-REFERENCE TO RELATED APPLICATIONS

This application claims priority to European Patent Application No. 12305486.8, filed Apr. 30, 2012, and all the benefits accruing therefrom under 35 U.S.C. §119, the contents of which in its entirety are herein incorporated by reference.

BACKGROUND OF THE INVENTION

The present invention relates to propellers and, in particular, to propeller blades formed having a foam spar core.

Modern propeller blades typically include root portions which extend into the hub arm of the hub of the propeller system and which are secured to and rotatable relative to the hub arm via a retention assembly. Typically the retention assembly includes one or a plurality of ball bearing assemblies which permit the rotation of the blade in the hub arm for accomplishing pitch change of the blade for altering the speed of the propeller and accordingly, the aircraft.

The blades are typically formed by surrounding a foam spar core with a resin impregnated fabric that is braided on to the form spar core. Leading and trailing edges of the blade are then formed over the fabric and surrounded by, for example, a Kevlar sock. Such blades are light and effective for their intended purposes.

BRIEF DESCRIPTION OF THE INVENTION

According to one embodiment, a propeller blade that includes a foam core and a structural layer formed of multiple layers that surrounds at least a portion of the foam core, is disclosed. The structural layer includes a mid-thickness location defined between the foam core and an outer edge of the structural layer and the multiple layers include at least one unidirectional layer and at least one biased layer disposed asymmetrically about the mid-thickness location.

According to another embodiment, a method of forming a propeller blade includes forming a foam core; and disposing a plurality of braided layers over at least a portion of the foam core to form a structural layer having mid-thickness location defined between the foam core and an outer edge of the structural layer, the plurality of layers includes unidirectional layers and a biased layers disposed asymmetrically about the mid-thickness location.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
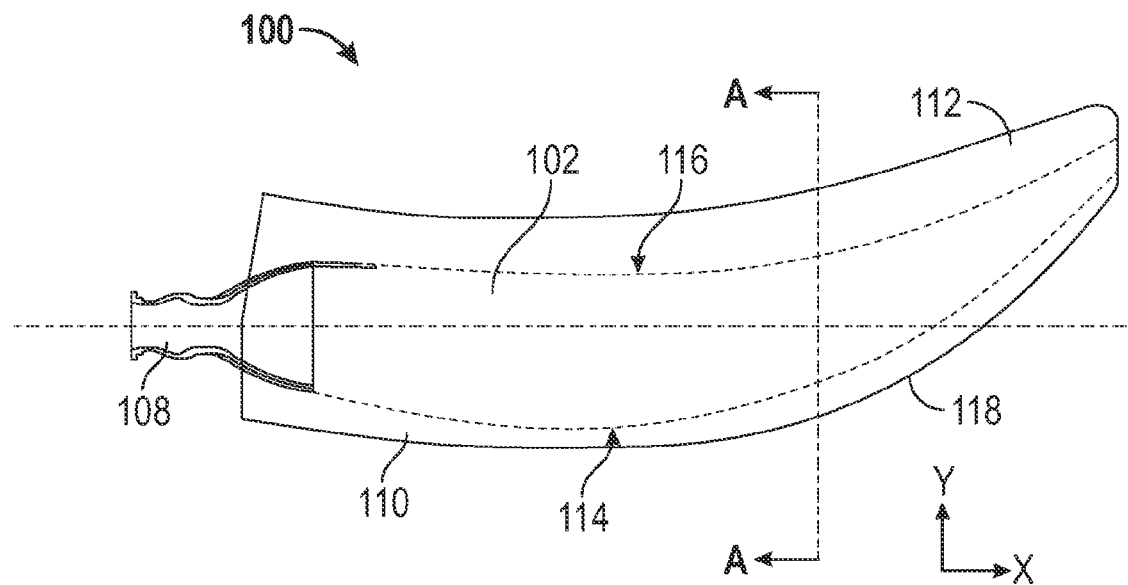
FIG. 1 is a plan-view of a prior art propeller blade.
Figure 2:
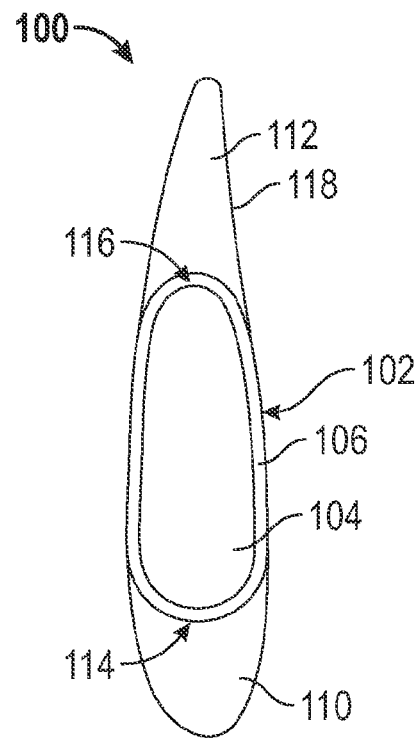
FIG. 2 is a cross-section of the propeller blade shown in FIG. 1.

Referring now to FIG. 1, a plan view of a conventional propeller blade 100 is illustrated and will be used to define certain terms, explain how a propeller blade is generally made, and to illustrate the differences between embodiments of the present invention and the prior art. Reference will also be made to FIG. 2, which is a cross-section of the propeller blade 100 of FIG. 1 taken along line A-A, for these purposes.

The blade 100 is formed by first forming a spar 102. The spar 102 includes a spar foam core 104 surrounded by a structural layer 106. The core 104 is typically formed of a foam material that is injected into a mold. The mold can include a layer of fiberglass on the walls thereof that to which the foam of the core 104 adheres. As such, the core 104 can be surrounded by a layer of fiberglass (not shown).

The structural layer 106 is typically formed of a dry braided carbon fiber which is subsequently resin injected, or a resin-impregnated fabric material (e.g. resin impregnated carbon fabric) and disposed such that it surrounds the core 104 (and the fiberglass layer if it is included). The structural layer 106 is typically braided onto the core 104. In some cases, the spar 102 is heated to set the resin in the structural layer 106. Considerable thermal stresses can occur in the core 104 as the spar 102 is cooled due to the differences in the coefficients of thermal expansion (CTE) of the core 104 and the structural layer 106.

In some instances, the spar 102 is formed such that a portion of it is surrounded by a root portion 108 that allows the blade 100 to be connected to a hub (not shown). Rotation of the hub causes the blade 100 to rotate and, consequently, causes the generation of thrust to propel an aircraft. In the following discussion, it shall be assumed that the blade 100 rotates in the clockwise direction. The root portion 108 is sometimes referred to as a "tulip" in the industry and is typically formed of a metal.

After the spar 102 is formed, leading edge foam 110 and trailing edge foam 112 are formed on the leading and trailing edges 114, 116, respectively of the spar 102. The leading edge foam 110, trailing edge foam 112 and the spar 102 can then be encased in an outer layer 118. The outer layer 118 can be formed of Kevlar and be in the form of a sock that is pulled over the assembly that includes the leading edge foam 110, trailing edge foam 112 and the spar 102. Of course, the outer layer 118 could be formed in other manners as well.

As described above, considerable thermal stresses can occur in the core 104 as the spar 102 is cooled due to the differences in the coefficients of thermal expansion (CTE) of the core 104 and the structural layer 106. In addition, thermal stresses can be created between the core 104 and the structural layer 106 due to the wide range of temperatures experienced by the propeller blade 100 in normal operation.

Figure 3:
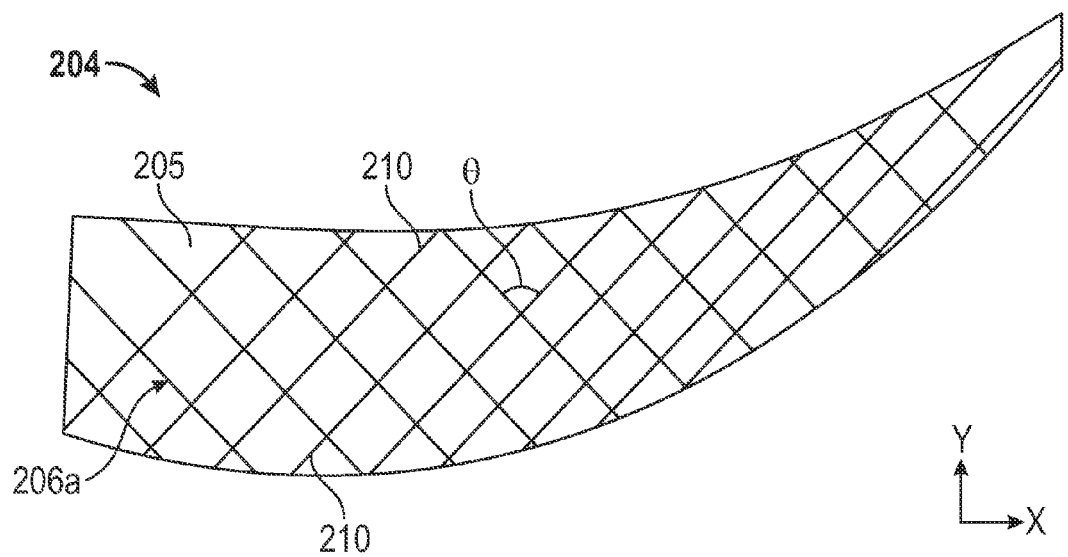
FIG. 3 is a plan view of a spar having a first ply of structural layer formed thereon.

FIG. 3 is a plan view of a spar 204 after a first braid ply 206a of a structural layer has been applied over the spar foam core 205. The first braid ply 206a is formed as a biased braid in this embodiment. The first blade ply 206a is formed of several structural fibers 210 that cross one another at a braid angle θ. In one embodiment, the structural fibers 210 are formed of carbon or a carbon based material. While not illustrated, it shall be understood that the structural layer could include other fibers between the structural fibers 210 formed of, for example, fiberglass or another suitable material. The other fibers do not provide appreciable (as compared to the structural fibers 210) stiffness to the spar 204. In one embodiment, the braid angle θ is about 90 degrees. Of course, this angle could be varied depending on the context. The manner of forming the biased braid ply 206a is known in the art and not discussed further herein.

Figure 4:
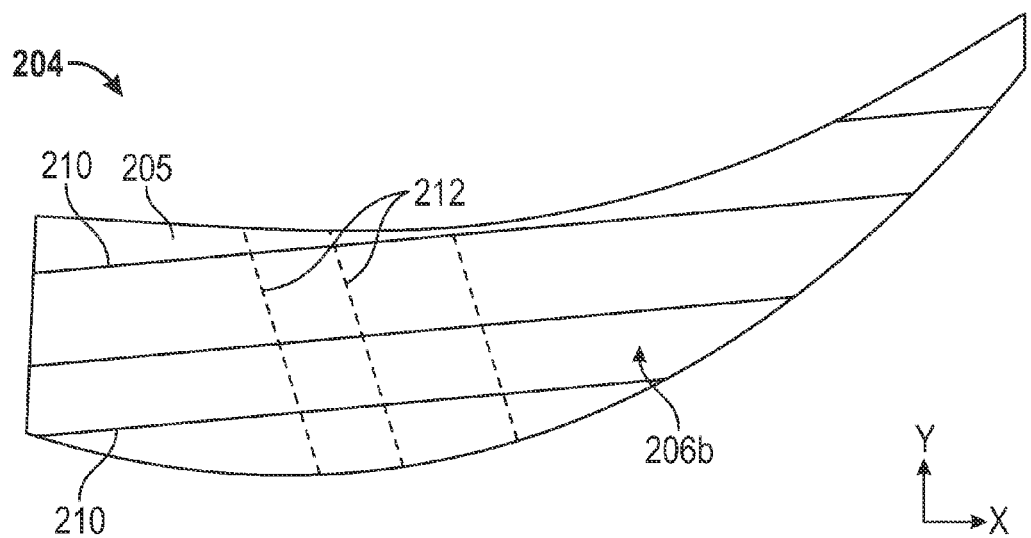
FIG. 4 is a plan view of a spar having a second ply of structural layer formed thereon.

FIG. 4 is a plan view of spar 204 after a second braid ply 206b of a structural layer has been applied to the foam spar core 205. The second braid ply 206b is formed on top the first braid ply 206a (not shown for clarity) in one embodiment. The second braid ply 206b is a unidirectional ply that includes carbon fibers 210 that generally extend along the spar 204 in the span wise direction X. In one embodiment, the structural fibers 210 of the second braid ply 206b are generally parallel to one another. The first braid ply 206a also includes other fibers 212 between the structural fibers 210 formed of, for example, fiberglass or another suitable material. The other fibers do not provide appreciable (as compared to the structural fibers 210) stiffness to the spar core.

Referring now to both FIGS. 3 and 4, and as described above, several braid ply layers can be formed to create the structural layer. In the prior art, it was convention to arrange the order in which plies 206a and 206b (or additional plies) were formed on the foam spar core 205 so that the assembly was balanced. The term "balanced" with respect to plies on a spar core 205 requires that the plies are arranged symmetrically about a mid-thickness location of structural layer. For instance, in FIG. 5, a conceptual view of a balanced set up of plies is shown in cross section as arranged on one side of a spar foam core 502. Only one side of the spar core 502 is shown but it shall be understood that the ordering of layers/plies can be the same on the other side going from the spar core 502 outward. As illustrated, four plies 504, 508, 506, and 510 are arranged about a mid-thickness location 500 of the spar layup 501. In order to be balanced, plies 504 and 510 are formed of the same material, thickness, and fiber orientation. In addition, to be balanced, plies 506 and 508 are formed of the same material, thickness, and fiber orientation.

As is known in the art, when plies are arranged in a balanced configuration, this prevents the spar assembly (combination of spar core 500 and spar layup 501) from being deformed during curing.

Figure 5:
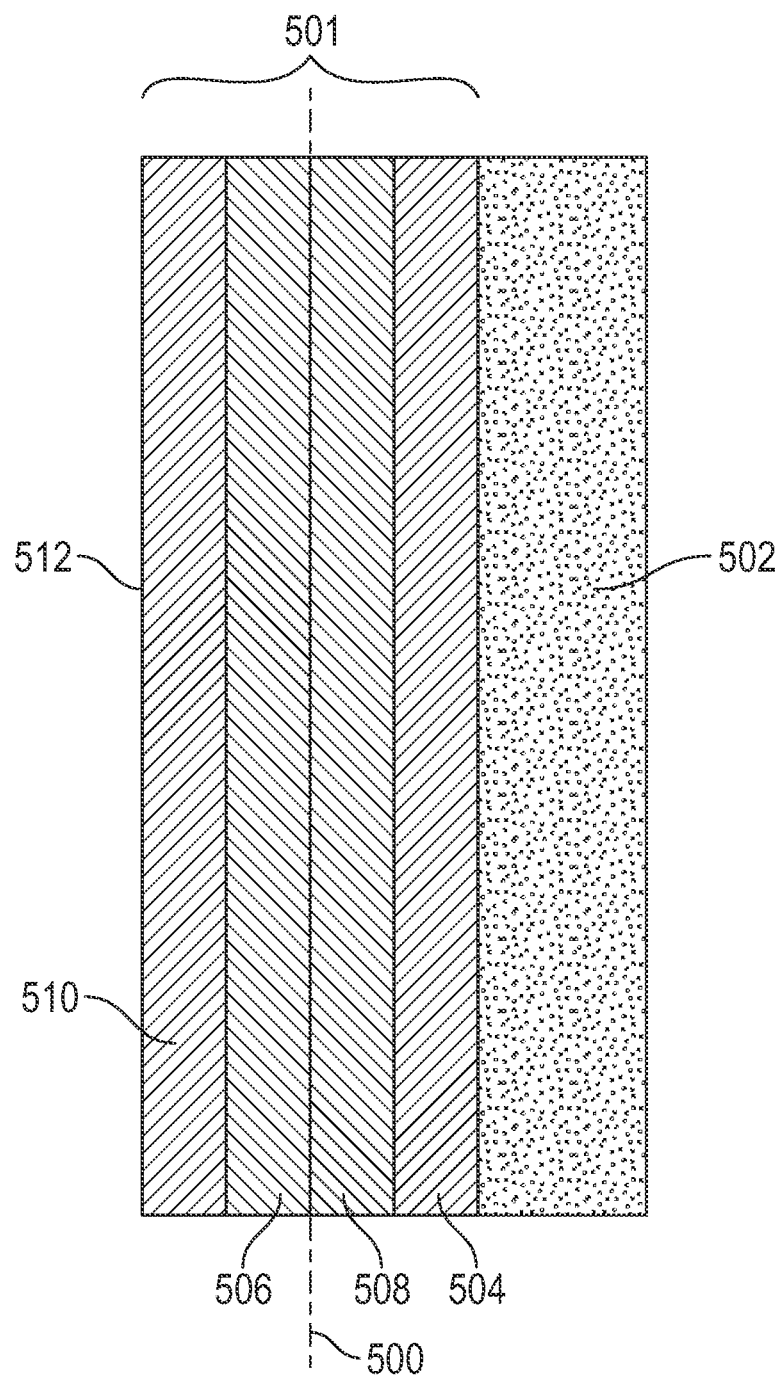
FIG. 5 is a conceptual view showing a spar layup and used to describe the difference between balanced and unbalanced spar layups.
Figure 6:
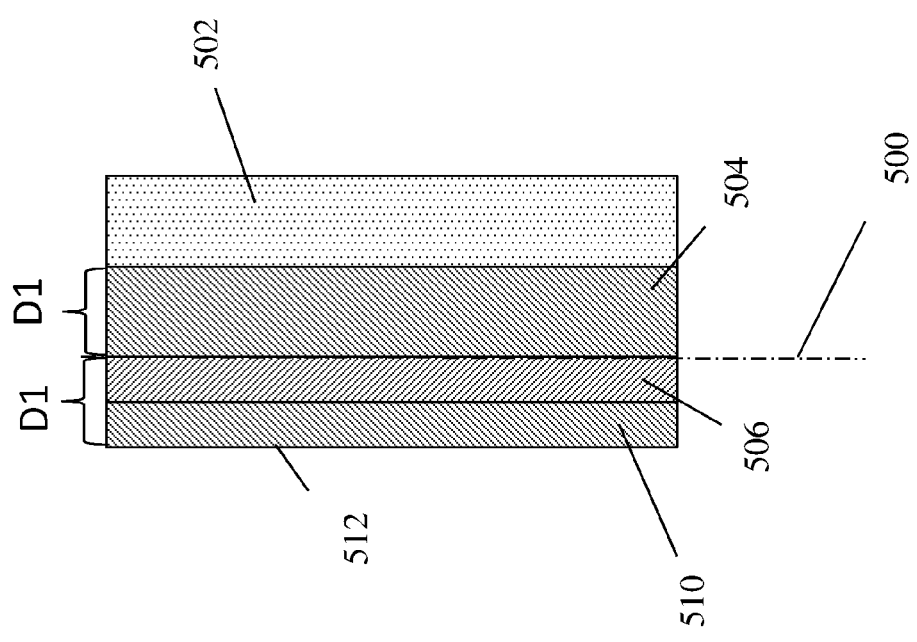
FIG. 6 shows an asymmetrical spar layup.

Referring now to FIGS. 3-5, according to an embodiment of the present invention, the spar layup 501 (e.g., order of types of plies) is modified from the prior art such that the spar is unbalanced. Such a modification may improve the thermal behavior of the spar 204. For instance, such a configuration could result in spar and camber sides providing some degree of compression to the spar foam core 205 after the resin injection cool down to room temperature, thereby improving the bond strength between the foam spar core 205 and the structural layer 206. In more detail, in one embodiment, the spar layup 501 is formed such that layers on opposing sides of the mid-thickness location 500 are not symmetrical. For instance, there could be more layers of biased braids on one side of the mid-thickness location 500 than the other (as shown in FIG. 6). The exact ordering can be varied so long and the layers are not symmetrical (e.g., asymmetrical) about the mid-thickness location 500 of the spar layup 501. As is evident from FIG. 5, mid-thickness location 500 is defined between the foam core 502 and an outer edge 512 of the spar layup 501 (e.g., in the middle of the structural layer).

In one embodiment, one or more additional unidirectional plies may be provided having structural fibers that extend in the chord wise direction Y to stiffen the spar 204 in the chordwise direction. This will reduce the outward deflection of the spar as the blade bends due to operating loads, resulting in lower thru-thickness tensile stresses in the foam, thereby preventing or reducing spar foam cracks.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A propeller blade comprising:
   a foam core; and
   a structural layer formed of multiple layers that surrounds at least a portion of the foam core, the structural layer including a mid-thickness location defined between the foam core and an outer edge of the structural layer;
   wherein the multiple layers include at least one unidirectional layer and at least one biased braid layer disposed asymmetrically about the mid-thickness location, wherein there are more layers of biased braids layer on one side of the mid-thickness location than on an other side of the mid-thickness location.

2. The propeller blade of claim 1, wherein the layers include structural fibers disposed therein.

3. The propeller blade of claim 2, wherein the structural fibers in the unidirectional layer extend in a span wise direction along the propeller blade.

4. The propeller blade of claim 2, further comprising:
   additional fibers not contained in either the at least one unidirectional layer or the at least one biased braid layers that extend in a chord wise direction along the propeller blade.

5. The propeller blade of claim 1, further comprising:
   a layer of fiberglass at least partially disposed between the foam core and the structural layer.

6. The propeller blade of claim 1, further comprising:
   a root disposed within the structural layer at an end of the propeller blade.

7. The propeller blade of claim 1, wherein the foam core is formed of polyurethane foam, polyisocyanurate foam, or polymethacrylimide foam.

8. A method of forming a propeller blade comprising:
   forming a foam core; and
   disposing a plurality of braided layers over at least a portion of the foam core to form a structural layer having mid-thickness location defined between the foam core and an outer edge of the structural layer, the plurality of layers includes unidirectional layers and biased braid layers disposed asymmetrically about the mid-thickness location, wherein more layers of biased braids are disposed on one side of the mid-thickness location than on an other side of the mid-thickness location.

9. The method of claim 8, wherein the layers include structural fibers disposed therein.

10. The method of claim 9, wherein the structural fibers in the unidirectional layers extend in a span wise direction along the propeller blade.

11. The method of claim 9, further comprising:
   disposing additional fibers not contained in either the unidirectional layers or the biased braid layers in the chord wise direction along the propeller blade.

12. The method of claim 8, further comprising:
   disposing a layer of fiberglass at least partially between the foam core and the structural layer.

* * * * *